(12) United States Patent
Roewe

(10) Patent No.: US 8,402,493 B2
(45) Date of Patent: Mar. 19, 2013

(54) COMMUNITY GENERATED CONTENT CHANNELS

(75) Inventor: James Roewe, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 762 days.

(21) Appl. No.: 12/274,989

(22) Filed: Nov. 20, 2008

(65) Prior Publication Data
US 2010/0125880 A1    May 20, 2010

(51) Int. Cl.
H04N 7/173 (2011.01)
(52) U.S. Cl. ............ 725/87; 707/5; 386/83; 709/226
(58) Field of Classification Search ............ 725/87; 386/83; 709/221; 707/5; 370/486
See application file for complete search history.

(56) References Cited

U.S. PATENT DOCUMENTS

| | | | |
|---|---|---|---|
| 7,266,686 | B1 | 9/2007 | Monteiro et al. |
| 2003/0037144 | A1* | 2/2003 | Pestoni et al. .............. 709/226 |
| 2007/0140300 | A1* | 6/2007 | Handekyn et al. ............ 370/486 |
| 2007/0180465 | A1 | 8/2007 | Ou et al. |
| 2007/0220553 | A1 | 9/2007 | Branam et al. |
| 2007/0250863 | A1 | 10/2007 | Ferguson |
| 2007/0300251 | A1* | 12/2007 | Hsu ................... 725/24 |
| 2008/0077867 | A1 | 3/2008 | Hake et al. |
| 2008/0109244 | A1* | 5/2008 | Gupta ................. 705/1 |
| 2008/0127241 | A1 | 5/2008 | Garcea |
| 2008/0189272 | A1* | 8/2008 | Powers et al. .............. 707/5 |
| 2008/0285943 | A1* | 11/2008 | Wang et al. .............. 386/83 |

FOREIGN PATENT DOCUMENTS
WO     0153970 A2    7/2001

OTHER PUBLICATIONS

Douglas Dixon, DVD on Demand: The Streaming DVD Experience, Manifest Technology, Apr. 2003 http://www.manifest-tech.com/media_dvd/dvd_demand.htm.

O. Friedrich, IPTV User Equipment for IMS-based Streaming Services, Network Operations and Management Symposium Workshops, Apr. 7-11, 2008, http://ieeexplore.ieee.org/ie15/4509915/4509916/04509922.pdf?isnumber=4509916&prod=CNF&arnumber=4509922&arSt=21&ared=25&arAuthor=Friedrich%2C+O.%3B+Seeliger&2C+R.%3B+Gouveia%2C+F.%3B+Arbanowski%2C+S.

(Continued)

Primary Examiner — Vivek Srivastava
Assistant Examiner — Anthony Bantamoi
(74) Attorney, Agent, or Firm — Vierra Magen Marcus LLP

(57) ABSTRACT

A method and system are disclosed for providing community defined and/or controlled channels where content for a channel may be continuously streamed to users based on input from users that participate in the channel. Channel definitions and content for different community channels may be stored in a community channel store within an on-demand media server capable of streaming content to subscribing users. One or more channels may be defined in the community channel store by a server administrator. Certain users may also have the ability to create channels within the community channel store. Each channel may be related to a topic, theme, type of content or anything of interest to a particular community of users. Content is added to each channel, which content is streamed to users continuously in a predetermined channel lineup. Ideally, there will be one or more channels that are tailored to a given community of users' viewing wishes, so that a user in that community may simply access a community channel and receive content that they are interested in without having to actively select the content they receive.

18 Claims, 8 Drawing Sheets

OTHER PUBLICATIONS

Dick C. A. Bulterman, User-Centered Control Within Multimedia Presentations, Nov. 15, 2006, Published Online Springer-Verlag 2006, http://www.springerlink.com/content/47004651707u6016/fulltext.pdf.

John Blossom, User-Generated Content and Social Networking Mix Fuel Vertical Communities: Gather.com, Robin Good, Nov. 15, 2005, www.masternewmedia.org/news/2005/11115/usergenerated_content_and_social_networking.htm.

Wowza Media Systems, Wowza Media Server Delivers in a Variety of Markets, Copyright 2006-2008, http://www.wowzamedia.com/markets.html.

* cited by examiner

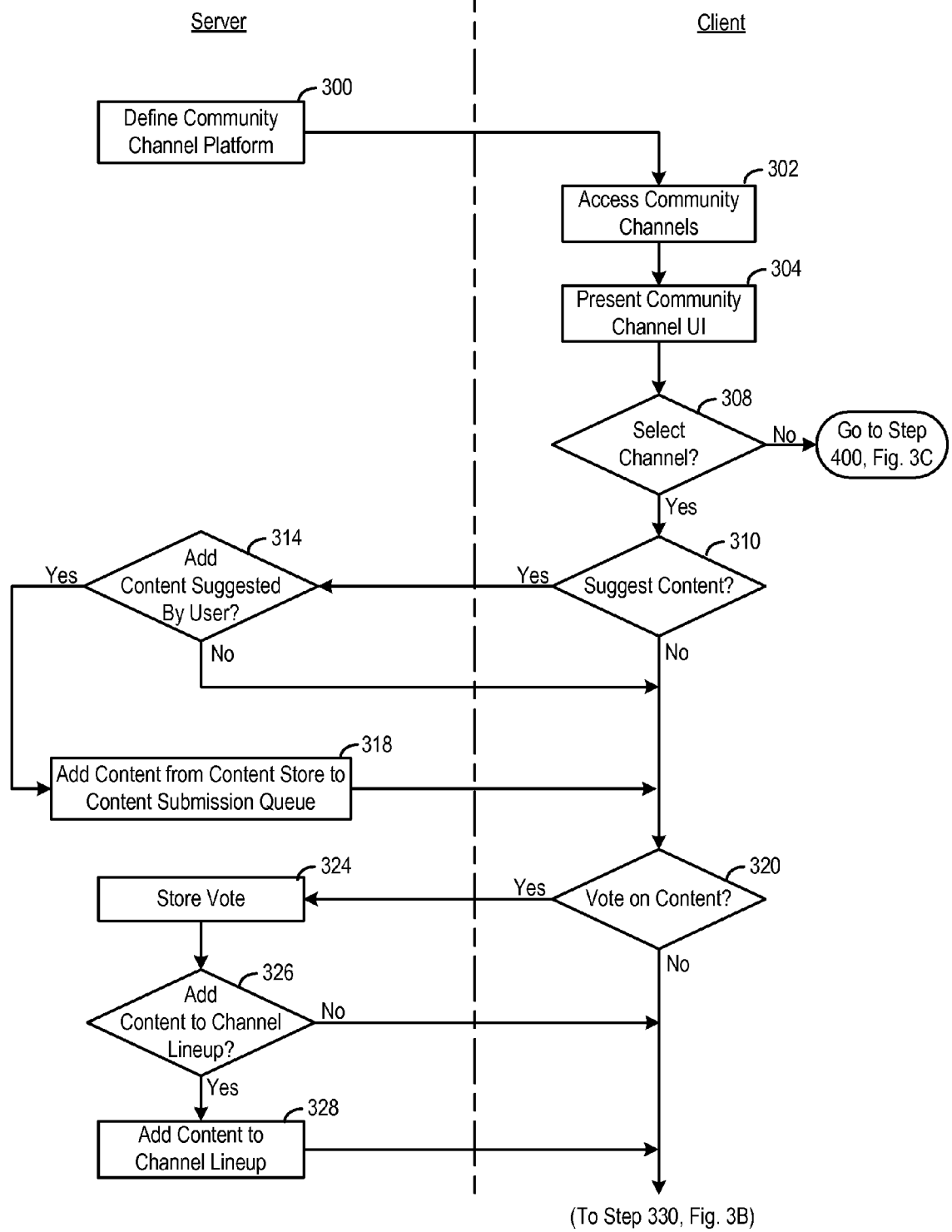

COMMUNITY GENERATED CONTENT CHANNELS

BACKGROUND

The convergence of computing and entertainment continues to provide new content and options for consumers. For example, cable and satellite subscribers can now access broadcast television programs and other on-demand content media through their set-top boxes. In one offering, on-demand service allows a user to select content for viewing from a library of content media, wherein any content is available for viewing at any time and can be paused, saved, rewound, etc. (as opposed to a broadcast television program that is only available at a scheduled time and duration).

On-demand media is ideal for those who actively want to control the content they view. A user interface allows users to search through one or more large databases of available content media so that the user can select only the content they are interested in viewing, precisely when they are interested in viewing that content. However, some users are less discerning about what they watch, and may not be interested in having to actively search for and select content. Their preference would be to have content that they enjoy provided to them with minimal effort on their part.

Some such viewers prefer broadcast television over video on demand content for this reason. With broadcast television, the content is determined by the broadcaster, and continuously broadcast in an unending transmission. Some people will select a particular broadcast television channel that they like, and will watch whatever content is broadcast on that channel. If a viewer does not like particular content on that channel, they either need to sit through it, change to a different channel or stop watching altogether. The viewers have limited, if any, ability to change the content provided by the respective broadcast channels.

Some Internet radio or video content stations offer a continuous stream of content and accept feedback from users on the content they would like to receive. However, even in these scenarios, the users do not make the ultimate decision as to what content is streamed. That decision is made by the content providers.

SUMMARY

Embodiments of the present system relate to a system of community defined and/or controlled channels where content for a channel may be continuously streamed to users based on input from users that participate in that channel. Channel definitions and content for different community channels may be stored in a community channel store within an on-demand media server capable of streaming content to subscribing users. One or more channels may be defined in the community channel store by a server administrator. In embodiments, certain users may also have the ability to create channels within the community channel store. Each channel may be related to a topic, theme, type of content or anything of interest to a particular community of users. Content is added to each channel, which content is streamed to users continuously in a predetermined channel lineup. Ideally, there will be one or more channels that are tailored to a given community of users' viewing wishes, so that a user in that community may simply access a community channel and receive content that they are interested in without having to actively select the content they receive.

Content for a channel may initially be selected at random from a collection of suggested content and streamed to users over the channel. Thereafter, users may provide feedback to the on-demand media server, which feedback is used to add content to, or take content off of, a given channel. As users can define what content is included in the predetermined content lineup for a channel, the content included in the predetermined channel lineup can grow over time as users with common content interests are drawn to and provide feedback on content for a given channel.

In embodiments, upon suggestion of content for a given channel, the content may be added to a content submission queue that is stored in the community channel store. Thereafter, other users may vote to add or not add that content to the predetermined channel lineup. The feedback from each user may be weighted equally when moving content onto the content submission queue and/or into the predetermined channel lineup. Alternatively, some users may have more weight than others with respect to their feedback.

In particular, where a first user has been a subscriber to a particular channel for a long period of time and/or where the first user has given feedback that has been well received and aligned with that of others in a channel community, more weight may be accorded the first user's feedback than a second user who is new to the channel or who has provided feedback that was not well received. The first user is said to have a better reputation than the second user on that channel. Reputation is measured herein with a stored reputation index that is determined based on a user's interaction and history with respect to a given channel. A user may have a high reputation index on one community channel, but a low reputation index on a different community channel.

Through a variety of graphical user interfaces, a user is able to provide feedback relating to content they wish to include on or remove from a given community channel. The present system may also provide the ability for a community to vote on whether to terminate a given content piece in the middle of its transmission. If some predetermined percentage of the community votes to terminate a given content piece, the content is terminated, and the next content piece in the predetermined channel lineup is then streamed. The start times of future, predetermined content pieces are adjusted accordingly. Users who wish to continue viewing content which is being terminated can exit the community channel platform, and have that content delivered from the main library of the on-demand media server.

BRIEF DESCRIPTION OF THE DRAWINGS

FIGS. 3A through 3C are flowcharts illustrating the operation of embodiments of the present system.

DETAILED DESCRIPTION

Embodiments of the present system will now be described with reference to FIGS. 1-8, which in general relate to a system of community defined and/or controlled channels where content for a channel may be continuously streamed to users based on input from users that participate in the channel.

Figure 1:
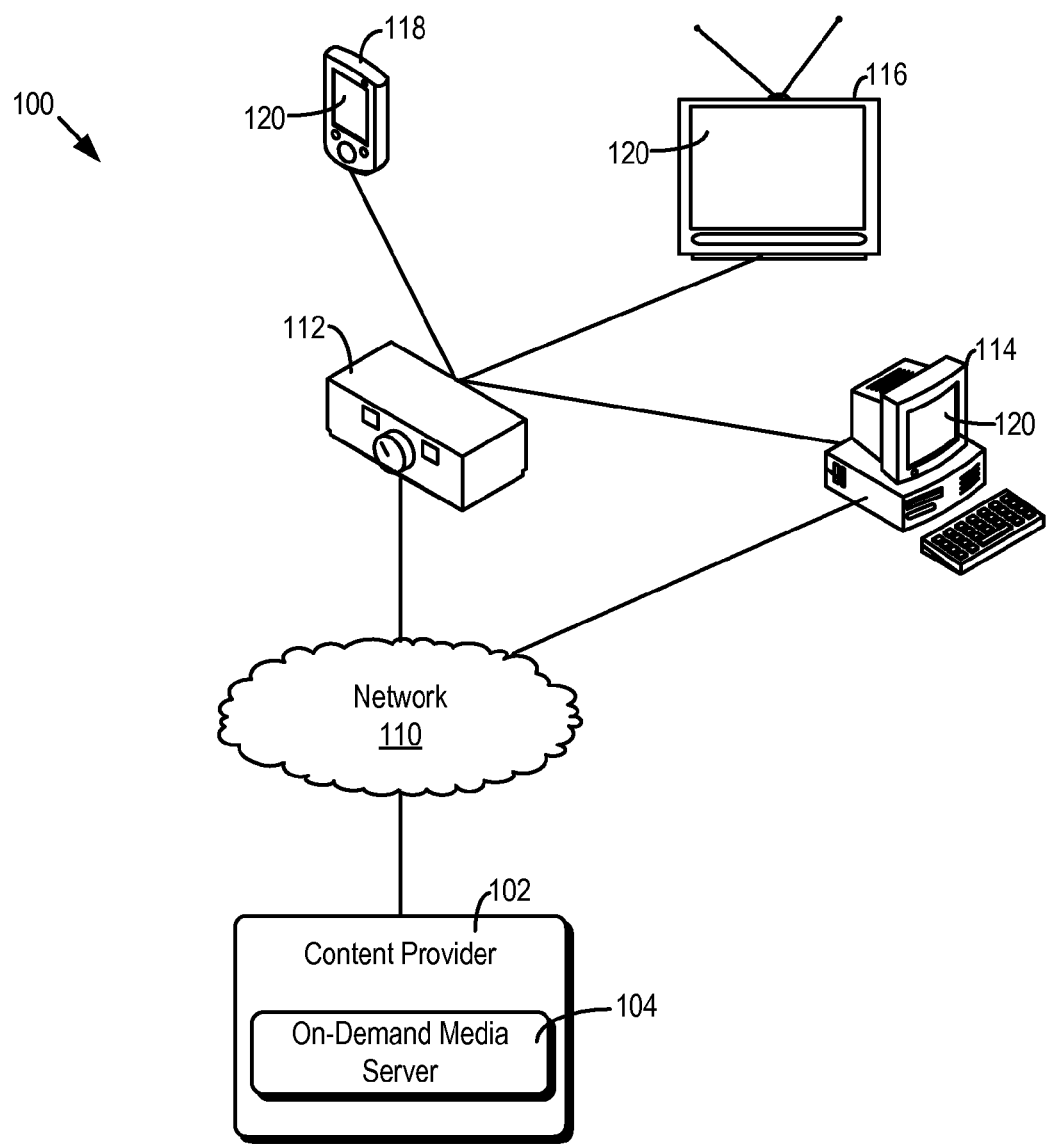
FIG. 1 is a block diagram of an embodiment for implementing a community channel platform according to the present system.

FIG. 1 illustrates an example of a hardware implementation 100 for carrying out embodiments of the present system. The hardware system 100 includes a content provider 102 having an on-demand media server 104 including media content as explained below. As used herein, media content may include movies, video games, television broadcasts, broadcasts of live events, music, radio talk shows, pictures, presentations, slideshows and other graphics, audio and video content. The media content may further include user-generated content, such as for example lecture, disc jockey and other live audio from a microphone or live video or images such as from a webcam, or non-live content such as user generated video uploaded to the media content store. The content provider 102 may be any service provider and/or website capable of providing media on demand from the media server 104 via a network such as the Internet 110. Instead of the Internet, it is understood that content provider 102 may disseminate media and channel content via radio waves, cable systems, satellite systems or combinations thereof.

Users may obtain on-demand media and channel content from content provider 102 via a tuner 112. As is known, tuner 112 may be a device such as a set-top box for receiving content from content provider 102 and formatting it for display on different client devices. These devices include for example a computing system such as a computer 114, a television set 116 and/or a mobile device such as a hand-held PDA or smart phone 118. For embodiments where the delivered content is video, each of the above client devices may include a display 120 for displaying the content. In further embodiments, the tuner 112 may for example be located internally within one or more of the computer 114, television 116 and/or hand-held device 118. In further embodiments, tuner 112 may be omitted altogether, and content may be transmitted from the content provider 102 directly to a client device, for example via a browser application running on the client device.

Figure 2:
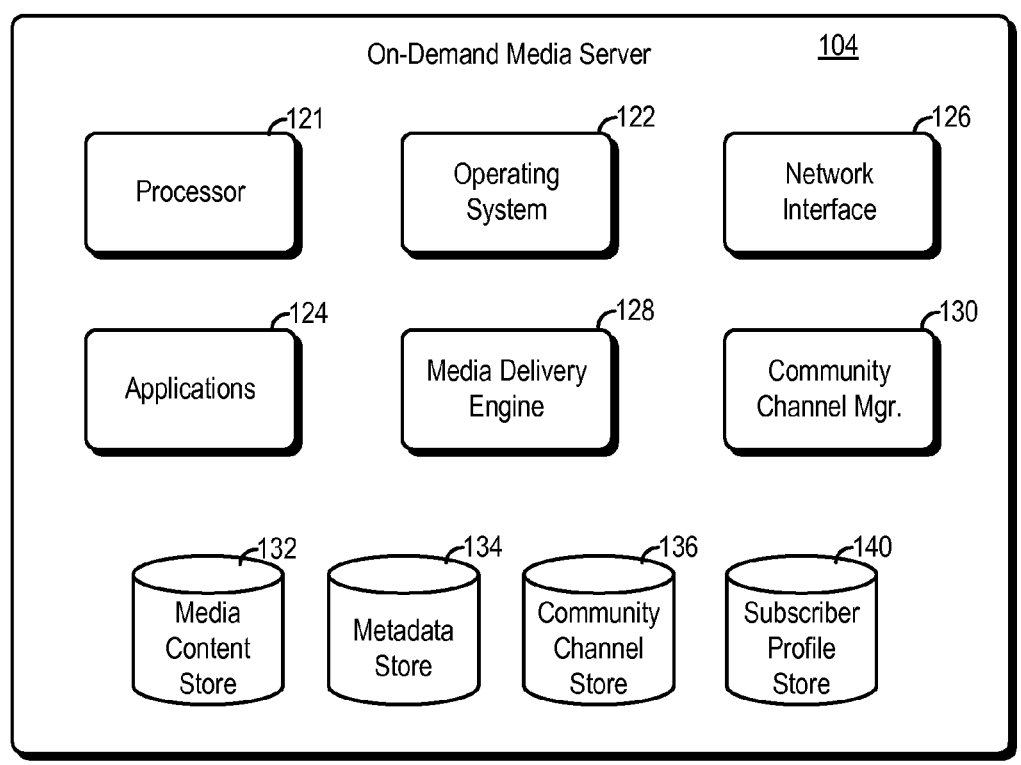
FIG. 2 is a block diagram of an on-demand media server according to embodiments of the present system.

FIG. 2 illustrates selected components of an exemplary on-demand media server 104. While media server 104 is described below as a single machine, it is understood that the below described components of media server 104 may alternatively be distributed across more than one machine. For example, it is understood that a first server may be a content server and a second server may be a distribution server for distributing content to users from the content server.

In an embodiment where the media server 104 comprises a single machine, the media server may include one or more processors 121, as well as an operating system 122 and one or more program applications 124 executed on processor 120. A network interface 126 may further be provided to enable communication between on-demand media server 104 and other computing systems, such as one or more of the client devices 114, 116 and 118 over a network such as the Internet 110. The media delivery engine 128 is configured to manage delivery of media content to the tuner 112 and/or client devices 114-118 based on requests received for the content media. Delivery of content may include downloading and streaming of content. In the present system, content may be pushed to users as explained below. The present system further includes a community channel manager 130 according to the present system for managing server side operations of community channels as explained hereinafter.

The on-demand media server further includes memory having various data stores 132-140. Although each is shown as a separate data store, it is understood that one or more of data stores 132-140 may be provided as part of a single database. Media content store 132 is the primary media storage location for content that may be requested by and served to one or more client devices. Metadata store 134 maintains metadata associated with media content stored in media content store 132. Metadata store 134 may include metadata for the content stored in the main content store and the community channel store described below. Such metadata may include title, cast, production and other data relating to the stored content in on-demand media server 104.

Data and information related to the community channel platform of the present system may be stored in a community channel store 136. The store 136 includes a list of community channels that have been defined, and is divided into respective channel entries, one for each community channel. Each channel entry may store a variety of data and information relating to the associated community channel. Such data and information in each channel entry may include a content submission queue and a content lineup for the associated channel. As explained below, the content submission queue includes content which has been copied from the main content store 132 but which has not yet been added to the predetermined community channel lineup. The stored content lineup is a listing of the present and future content which has been predetermined for streaming to users on the associated channel. Content provided within community channel store 136 is largely or entirely dictated by user feedback, which feedback may also be stored within the community channel store 136 or elsewhere.

The on-demand media server 104 may further include a data store 140 of subscriber profile information, such as user name, contact information, billing history, demographic information and a list of the community channels which a user has viewed and/or to which a user has provided feedback. As explained below, users may acquire a certain reputation with respect to one or more channels. Upon acquiring such a reputation, their feedback may be accorded more weight than for example a user who is providing feedback for the first time on a community channel. Such reputation data may also be stored in association with each user on subscriber profile store 140. It is understood that on-demand media server 104 may include additional components in embodiments of the present system as is known in the art.

In general, the present system relates to community defined and/or controlled channels where content for a channel may be continuously streamed to users based on input from users that participate in that channel. Each channel may be related to a topic, theme, type of content or anything of interest to a particular community of users. Channels may for example be created for full length movies (with a different channel devoted to different movie genres such as comedy, suspense, romance, etc.), television series, sporting events, video games, shopping, radio programs, etc. These categories of community channels are by way of example, and there may be many more and/or different categories of channels in different embodiments.

Each channel delivers a predetermined lineup of content, appropriate to that channel, to all users that select that channel. The predetermined lineup of content is determined by a community of users, based on feedback provided by the users. As explained below, new community channels may be created, and content may be added and/or removed from a given channel, based on feedback from users in the community. Ideally, there will be one or more channels that are tailored to a given community of users' viewing wishes, so that a user in that community may simply access a community channel and receive content that they are interested in without having to actively select the content they receive.

The operation of embodiments of the present system will now be explained with reference to the flowcharts of FIGS.

3A-3C, which illustrate the interaction between the on-demand media server 104 and client devices (including tuner 112 and/or devices 114-118). In a step 300, the community channel platform is set up by an administrator for the on-demand media server 104. The administrator sets up the community channel manager 130 and the community channel store 136.

A system administrator may set up a new community channel in community channel store 136 by configuring the required settings in media server 104, and saving those settings within community channel store 136. The method for setting up a new channel may entail an administrator setting a channel name, a channel description and adding some amount of initial content. This initial content may be selected and approved by a community of users, or may be selected by the administrator. Instead of creating a new channel from scratch, an administrator may split an existing channel into one or more other channels, which definition of one or more new channels is then stored in community channel store 136. In further embodiments, it is contemplated that users could be allowed to create channels, although such embodiments may require system administrator approval for user created channels.

Once a community channel is created, users may opt to receive the initial content from that channel as explained hereinafter. The channel lineup (i.e., the predetermined content pushed to users on a community channel) may be chosen at random from the initial content. Thereafter, a community of users for the channel can vote to add content to the channel or delete content from the channel as explained below, so that the content is no longer randomly selected. In step 300, the administrator also sets up a policy as to how user feedback and user reputation are used to set the content in the predetermined channel content lineup that is streamed to each of the client devices on each channel. The use of user feedback and reputation are explained below.

Figure 4:
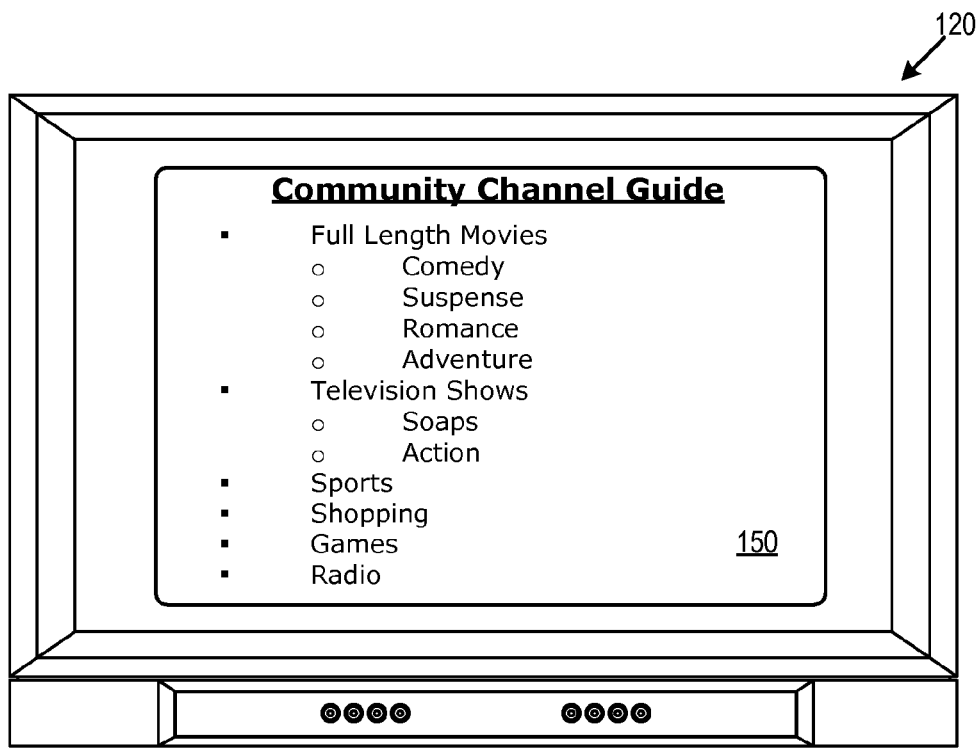
FIGS. 4 through 7 are exemplary graphical user interfaces which may be presented to users of the present system.

In a step 302, a user may access the community channel platform on his or her client device. Upon accessing community channels, the client device may present the user with a community channel user interface in step 304. FIG. 4 shows an example of a client device display 120 including a graphical user interface 150 which may be displayed to a user upon a user accessing the community channels. User interface 150 may for example present a list of the different community channels from which the user may choose. The channels may be presented as high level channels with one or more being broken out into subcategories of the higher level. For example, the community channel guide may include a high level category of full length movies and subcategories of different types of full length movies as shown in FIG. 4. Each of the subcategories may be further broken out into further subcategories, or alternatively, the user interface 150 may include only high level categories. It is understood that the user interface 150 shown in FIG. 4 is by way of example only and the user interface for community channels may take on a wide variety of different appearances in alternative embodiments.

Figure 3B:
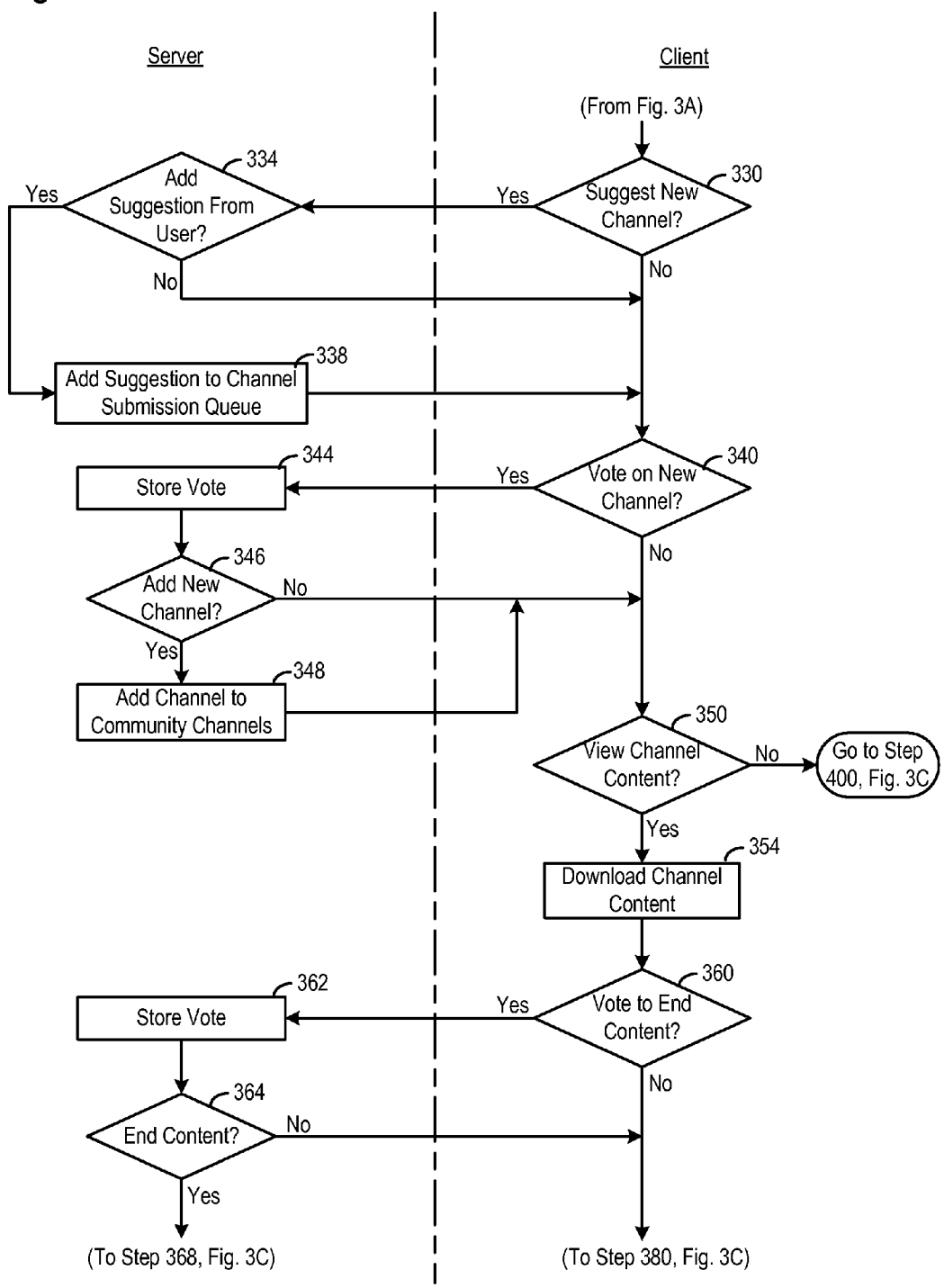
Figure 3C:
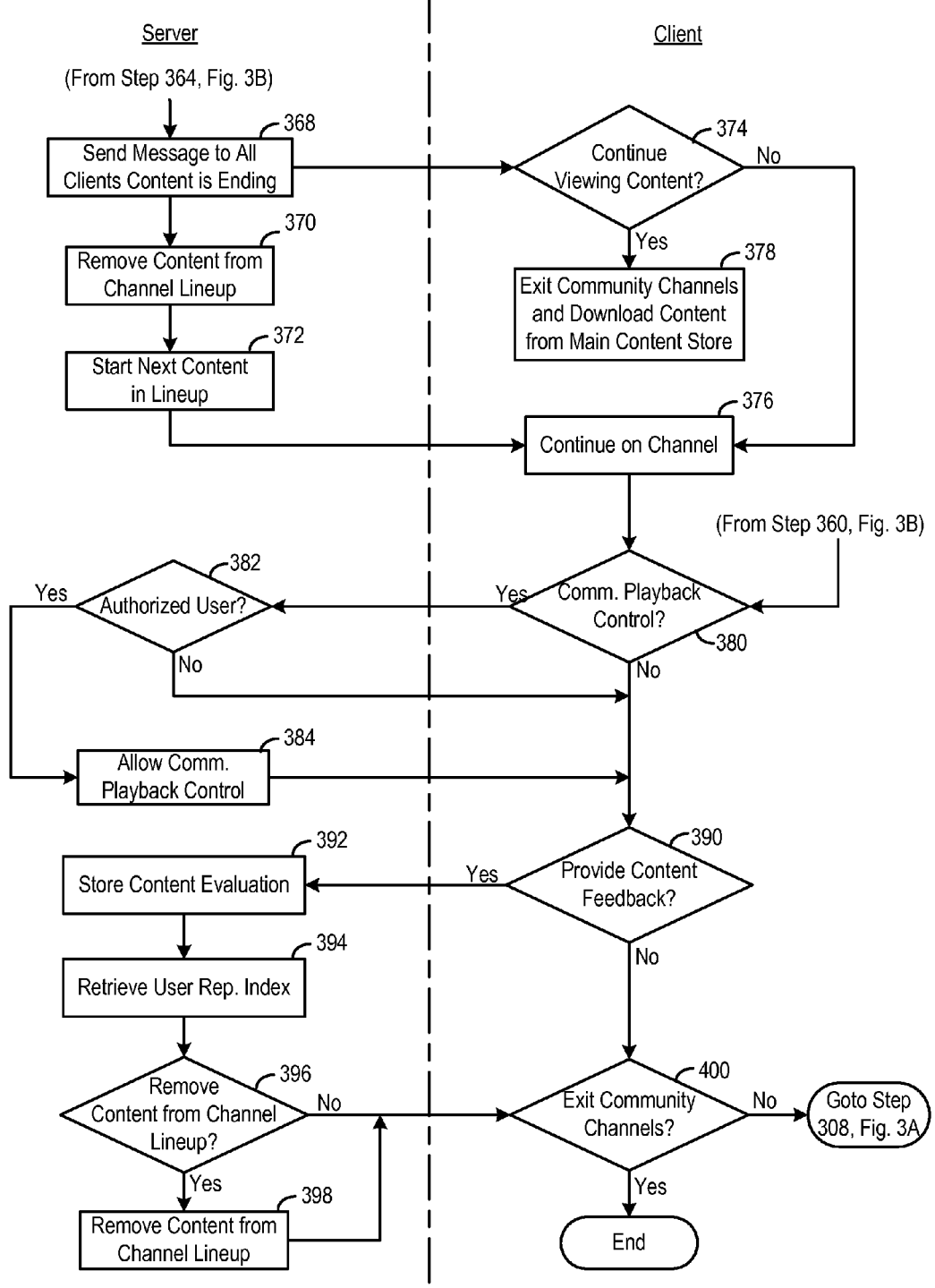
Figure 5:
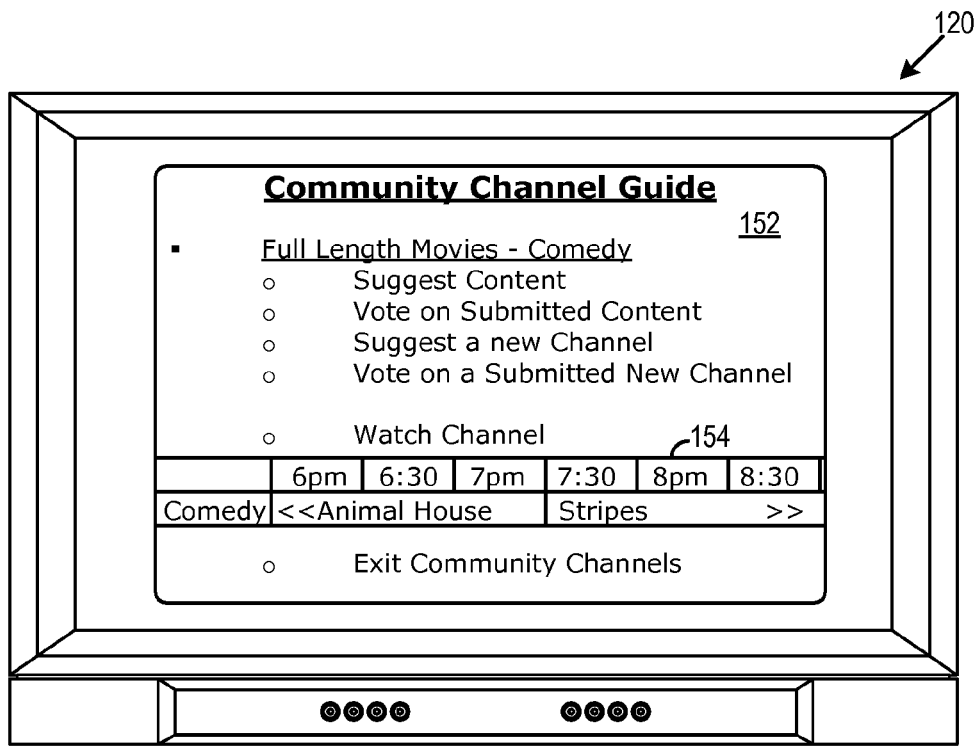

In step 308, the client device waits for the user to either select a channel, or exit the community channels (step 400, FIG. 3C). If the user selects a channel in step 308 via user interface 150, the client device may present the user with a further user interface 152 shown for example in FIG. 5. In the example of FIG. 5, a user has selected the community channel for full length movies—comedies, but the following description may apply to selection of any of the community channels.

User interface 152 may present the user with a variety of options including: to suggest content for this channel; to vote on previously submitted content; to suggest a new channel (for example a further subcategory under comedies); to vote on a previously suggested new channel; or to watch content from that channel. User interface 152 might further include a channel guide 154 showing the predetermined lineup of content being pushed to client devices from the community channel store 136 by media delivery engine 128 for the selected channel. It is understood that the user interface 152 shown in FIG. 5 is by way of example only and may take on a variety of appearances in alternative embodiments. Moreover, it is understood that one or more of the options to suggest/vote on content and to suggest/vote on new channels may alternatively be presented on the main menu graphical user interface 150 shown in FIG. 4 (i.e., before a user has selected a particular channel).

Figure 6:
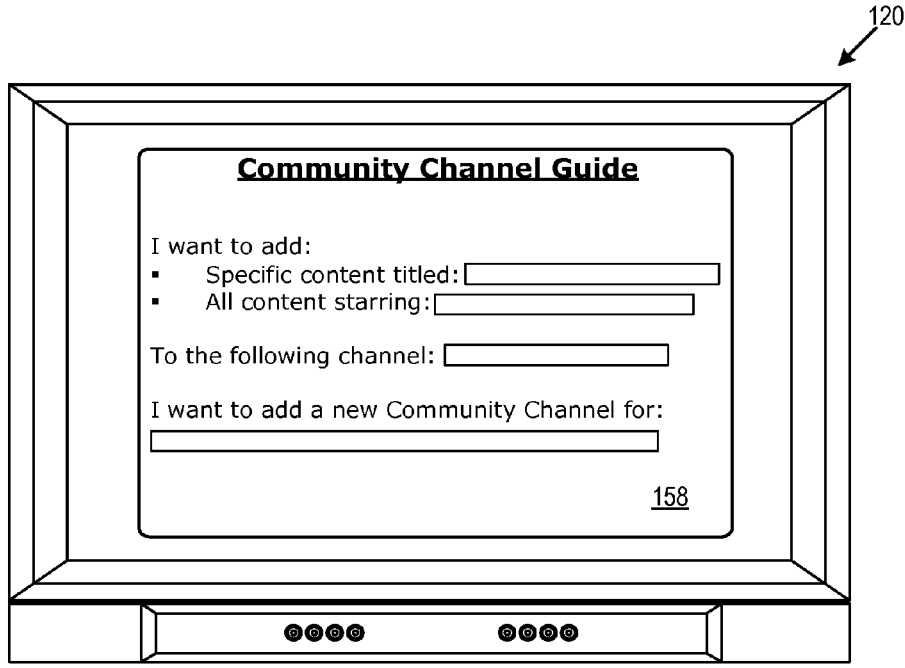

If the user elects to suggest content for addition to a channel in a step 310, the client device may present the user with a further graphical user interface 158 as shown for example in FIG. 6. User interface 158 is by way of example only, but in general may provide the user with options for suggesting specific content or otherwise describing content they would like to see on a particular channel. In step 314, the user's suggestion of content is received in the on-demand server 104, and the community channel manager 130 determines whether to add the suggested content to a content submission queue in step 318. In particular, in embodiments, before suggested content is added to a channel, it must be voted on by the community to determine whether the channel community considers the suggested content a good fit for the community channel. Accordingly, suggested content may first be added to a content submission queue and subsequently, users of the community may view content on a content submission queue and vote to add or not add content on the queue to the community channel.

The community channel manager 130 may be programmed to follow a wide variety of policies in determining whether content suggested by a user in step 310 is added to the content submission queue in step 318. In one embodiment, upon receipt of suggested content from a user, the community channel manager may access the user's profile from subscriber profile store 140 to obtain a reputation index for that user. In general, a user's reputation index for a given channel represents the user's reputation for suggesting content for a new channel, or for suggesting new channels in general. For example, longstanding viewers of a given channel may acquire a higher reputation index than for example viewers who have tuned into a channel for the first time.

The community channel manager may be programmed with a policy for example that each time a user tunes into a given channel, the user's reputation index for that channel may be incremented by 1. As a further or alternative embodiment, a user's reputation index may be augmented by suggesting content that is added to a channel and is favorably reviewed based on feedback by others in the community for that channel. Those of skill in the art will appreciate a wide variety of other policies which may be implemented to set the user's reputation index for a given channel based on the user's interaction and history with a given channel. Such interaction and history may include when the user first viewed the channel, the amount of time the user spends viewing a channel, the amount of feedback provided by the user and the degree to which the user's feedback was aligned with others in the community for that channel.

A user may have different reputation indices for different channels, for example in a case where a user is a longstanding viewer of a first channel, but has only just tuned into a second channel for the first time. A user's reputation indices may be managed by the community channel manager 130 and stored along with other user profile data in subscriber profile store 140.

Accordingly, in step 314, the community channel manager may add content suggested by a user to a content submission queue if the user's reputation index for that channel is above a threshold level. Content submission queue may be stored within community channel store 136. In further embodiments, the concept of a reputation index may be omitted or not used, and the community channel manager may add any and all suggested content to the content submission queue. In embodiments using reputation indices, if the community channel manager determines that the reputation index for the user suggesting content is below a threshold level, the community channel manager may skip step 318 and not add the content to the content submission queue.

If the community channel manager determines content should be added to the content submission queue in step 314, content from the main media content store 132 is copied into the community channel store 136 in step 318. There may be a separate content submission queue for each community channel entry in channel store 136 for content which has been copied from the media content store 132.

In step 320, users also have the option to vote on content on the content submission queue. In particular, before suggested content is added to a channel, it must be voted on by the community to determine whether the content is a good fit for the community channel. Accordingly, users of the community may view content on a content submission queue and vote to add or not add content on the queue to the community channel. In step 320, a user may vote on content in a content submission queue, for example via graphical user interface 152 of FIG. 5. In step 324, a user's vote is stored on media server 104, for example in community channel store 136.

A user's vote in step 320 may or may not be weighted based on the user's reputation index for that channel. In particular, in embodiments, a vote from a user having a high reputation index for a given channel may be accorded more weight than a vote from a user having a lower reputation index for that channel. In embodiments where users' votes are weighted in accordance with a reputation index, a user's weighted vote is stored in step 324. The concept of a reputation index may be omitted or not used, and all stored votes may be weighted the same.

In step 326, the community channel manager 130 determines whether to add content to a particular channel lineup based on votes for that content from users in the community. For example, if some percentage (e.g., 60%) of votes in a community are in favor of adding content from the submission queue to the predetermined channel lineup, then the community channel manager 130 adds that content to the channel lineup in step 328. In embodiments using reputation indices, a user having a high reputation index may for example get more votes than a user having a lower reputation index. The channel lineup for each channel may be stored in the respective channel entries in the community channel store 136.

If a given content does not receive a threshold favorable vote, or if the given content receives a threshold negative vote, then step 328 of adding that content to a channel lineup may be skipped. Periodically, the community channel manager 130 may purge content that has been on a content submission queue for a given period of time without being voted into the channel lineup by the community.

In embodiments, content is only added to a channel lineup upon being voted into the channel lineup by a segment of the viewing community for that channel. However, in further embodiments, certain content may be automatically added to a channel even if not voted onto the channel by the community at large. For example, when the community has indicated that it would like to add an episode of an ongoing series, the community channel manager 130 may automatically add other episodes in that series onto the channel lineup. In embodiments, the community channel manager 130 may dedicate a block of time to a marathon viewing of back-to-back episodes of a given series.

While embodiments described above include the intermediate step of moving content onto a content submission queue, and from there voting on content to be added to the channel lineup, it is understood that the intermediate step of the content submission queue may be omitted in alternative embodiments. In such alternative embodiments, a user (having the requisite reputation index or otherwise) may vote content directly into the channel lineup. Thereafter, users may provide feedback on the content, whereby the community channel manager may determine to maintain or drop that content.

Users may also suggest/vote on whether to add new channels to the community channel platform, for example via user interface 152 in FIG. 5. In step 330 (FIG. 3B), a client device determines whether a user has suggested addition of a new channel. If so, the client device may present the user with the graphical user interface 158 as shown for example in FIG. 6. In step 334, the user's suggestion of a new channel is received in the on-demand server 104, and the community channel manager 130 determines whether to add the suggested channel to a channel submission queue in step 338. Instead of suggesting a new channel that may be a splinter or subcategory of an existing channel, a user may instead suggest a new channel from the main user interface 150 shown in FIG. 4 to create a brand new channel for a niche not currently covered by an existing channel.

The community channel manager 130 may apply a variety of policies to determine whether a user's suggestion to add a new channel to the channel submission queue will be accepted or denied. As indicated above, a user's reputation indices may be different for different channels. As such, the use of a reputation index for suggesting a new channel may be different than the use of a reputation index for suggesting content on a given channel.

However, a "channel reputation index" may be determined for each user, which is the reputation index used by the channel manager when a user suggests a new channel or votes on a new channel. A user's channel reputation index may be the cumulative reputation indices, or an average of the reputation indices, for the user. In alternative embodiments, a user's channel reputation index may be the highest reputation index the user has on any given channel. Those of skill in the art will appreciate other policies for determining a channel reputation index for users.

In step 334, the community channel manager 130 applies a policy to determine whether a user's channel reputation index is such that his or her suggestion that a new channel should be added to the channel submission queue is accepted or denied. If accepted, the suggested new channel is added to the channel submission queue in step 338 for a vote by other members of the community. If not, then step 338 may be skipped. The concept of a channel reputation index may be omitted or not used, and all user suggestions for new channels get added to the channel submission queue. The channel submission queue may for example be stored in the community channel store 136.

In step 340, users have the option to vote on whether to add a new channel from the channel submission queue, for example via graphical user interface 152 of FIG. 5. In particular, users of the community may view new channel suggestions on the channel submission queue and vote to add or not add the new channel. In step 344, a user's vote is stored on media server 104, for example in community channel store 136. A user's vote in step 340 may or may not be weighted based on the user's channel reputation index for choosing new channels. The concept of a channel reputation index may be omitted or not used, and all stored votes on whether to add new channels may be weighted the same.

In step 346, the community channel manager 130 determines whether to add a new channel based on votes for that channel from users in the community. For example, if some percentage (e.g., 60%) of votes favor the creation of the new channel, then in step 348 the community channel manager 130 can indicate to an administrator to add the channel as described above. In a system using channel reputation indices, users with higher indices may get more votes. If a given channel does not receive a threshold favorable vote, or if the given channel receives a threshold negative vote, then step 348 of adding the new channel may be skipped. Periodically, the community channel manager 130 may purge suggested channels that have been on the channel submission queue for a given period of time without being voted in as a community channel.

While embodiments described above include the intermediate step of moving newly suggested channels onto a channel submission queue, and from there voting on whether to add the channel to the community channel platform, it is understood that the intermediate step of the channel submission queue may be omitted in alternative embodiments. In such alternative embodiments, a user (having the requisite channel reputation index or otherwise) may vote for creation of a channel and that channel is created. Thereafter, a system administrator may drop the channel from the channel community platform if there are not a threshold number of viewers to that channel. Moreover, at all of the above described points where user feedback on content is accepted, the user may also have the option to provide an explanation of why the user believes the channel should be added and/or why the content should be added to the submission queue or content lineup.

In step 350, the client device determines whether the user has selected to watch content on a given channel. If the user has not selected any of the options available from user interface 152, the client device determines whether the user wishes to exit the community channel platform in step 400. On the other hand, if the user has opted to view the predetermined pushed content on a channel, the content may be streamed to the user. In particular, the identification number for that content may be sent to the media delivery engine 128, which may access the content from the appropriate channel entry in the community channel store 136, and then stream the content to the user's device in step 354.

The predetermined channel lineup on a given channel may be set by the community channel manager 130 in a number of ways. As indicated above, initially, channel content may be selected at random from a list of suggested and/or approved content for that channel. Over time, as feedback is received, only content that has specifically been voted into the lineup by the community for a channel may be used in the channel lineup.

The order of content on the channel lineup may also be set by the community channel manager 130 in a number of ways. In one example, time slots may be rated most popular to least popular in a given time sequence, such as for example over a 24 hour cycle. The most popular content based on user feedback may be shown in the most popular time slot, the second most popular content played in the second most popular time slot, and so on. A policy may additionally be applied where more popular content is shown more frequently. Alternatively, a time sequence may be broken down into different time segments, including popular time segments (e.g., prime time) and less popular time segments (e.g., off peak hours). Content may also be broken down into different categories, from most popular to least popular. Content from the most popular category may be selected at random for streaming during the most popular time segments, etc.

Once a user has chosen to view content from a given channel, content from that channel will be continuously streamed to the user from the predetermined lineup of content. Upon completion of a given content, the next content scheduled for that channel is then sent to the user. In particular, the media delivery engine 128 obtains the content identifier for the next scheduled content in the content lineup from the community channel store 136, accesses the next scheduled content from the media content store 132, and streams that content to users who are then viewing that channel. While the user is free to provide feedback, the user may alternatively take no action and content from his or her selected community channel will be continuously delivered for viewing by the user.

A predetermined lineup may be set for varying periods into the future, such as for example a day into the future, a week in the future, etc. In alternative embodiments, the lineup may be set "on the fly," where users are polled upon completion of a given content as to what they would like to view as the next content. The majority's selection may then be accessed from the community channel store and streamed to viewers on the channel.

Referring now to step 360, in embodiments, users may be given the option to terminate the running of a particular content piece in the middle of that content. For example, during the running of a content piece, users may access a graphical user interface (not shown), where the user is given an option to vote to end the then-running content. Such an option may alternatively be provided on a remote control device for controlling the tuner and/or client device.

Upon voting to end content in step 360, the vote is stored in community channel store 136 or elsewhere on media server 104 in a step 362. In embodiments, each user may have a single equal vote, or votes may be weighted in accordance with a user's reputation index for that channel. In step 364, the community channel manager 130 determines whether there are sufficient votes to terminate the content. For example, if some percentage (e.g., 60%) of votes are received to terminate content, then the community channel manager 130 may terminate the content.

In this event, the community channel manager 130 may send a message to all client devices that the content is ending in step 368 (FIG. 3C). The community channel manager 130 may then remove that content from the channel lineup in step 370, and may obtain the identifier for the next content in the lineup and direct the media delivery engine 128 to deliver the next content to users in step 372. The start times of future content in the lineup may be adjusted accordingly.

Although the community at large has voted to terminate a given content piece, it may happen that a user wishes to continue viewing that content. As such, upon receipt of the message from media server 104 that the content is ending in step 368, users may be given the option to continue viewing the current content in step 374. If the user does not wish to continue viewing the current content, the user may continue on the same channel in step 376, and the next content in the lineup is streamed to the user. If, on the other hand, the user wishes to continue viewing the current content, the user is given the option of exiting the community channels and delivering the cancelled content from the main media content store 132 in step 378. After they are done viewing their content, they may be given the option to rejoin the community channel they were watching.

The present system may further offer certain users the ability to pause, rewind, fast forward and seek through the content being transmitted to the entire community of users for a channel in step 380. The ability of a single user to pause, rewind, fast forward and/or seek through content that is transmitted to the entire community is referred to herein as community playback control. The community playback control of content in step 380 will affect not only that user's viewing of content, but the transmission of that content to all users. That is, if user A pauses or rewinds content, that pause or rewind of the content will also be seen by viewers B, C, etc. Accordingly, in embodiments, only certain, authorized users may have community playback control of the content transmitted to the community at large. Once a user attempts community playback control of the content in step 380, the request is transmitted to the media server 104 where community channel manager 130 determines if the user is an authorized user in step 382.

If the user is in fact an authorized user, the user may then control the playback of content to the entire community in step 384. If the community channel manager determines that the user is not an authorized user, the community playback control request from the user is ignored. In embodiments, a user may become an authorized user with community playback control privileges upon attaining a requisite reputation index for that channel. Alternatively, such community playback control privileges may be awarded to one or more users upon being selected at random ("king for a day" privileges), or as a reward for purchasing the products or services of an advertiser sponsoring the content download. In further embodiments, although potentially yielding unruly results, every user may have community playback control of the content on a given channel. In any of the above embodiments, safeguards may be provided so that only one user at a time has community playback control privileges. In a further embodiment, the community playback control ability described with respect to steps 380-384 may be omitted altogether.

In the embodiments described above, an authorized user may have community playback control of the content for the community channel as a whole. It is further contemplated that individual users may pause, rewind, fast forward and seek through content locally at the client level (i.e., local playback control that affects a user's own content without affecting the play of content to other users in the community). One difficulty with local playback control is that content played over the community channel generally starts and ends at the same time for the whole channel community. In embodiments, a buffer may be provided at the server level after completion of content so that individuals who exercised local playback control of their own content download may catch up with the rest of the community. Alternatively, if a user is trailing or has advanced their content more than a threshold amount relative to the content shown to the community, the user may be given the option to exit the community channels, and receive that content from the main content store 132 to continue viewing that content at their own pace. After they are done viewing their content, they may be given the option to rejoin the community channel they were watching.

Figure 7:
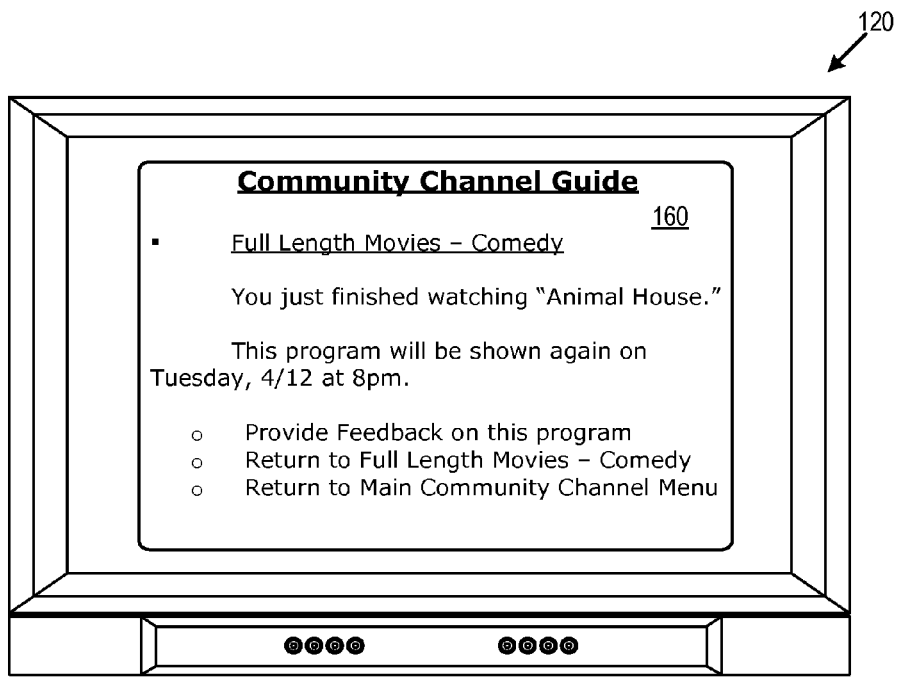

In step 390, for example at the completion of a content piece, a user may be given the option to provide feedback on content, such as for example via user interface 160 shown in FIG. 7. If a user selects the "Provide Feedback on this Program" option, the user may be taken to a further screen eliciting the user's feedback on the content. For example, the user may be asked to vote on whether to maintain or delete the content from the channel lineup. Alternatively, the user may be asked to rate the content on a scale from 1 to 10. Other types of feedback responses are contemplated.

The feedback user interface 160 may further include a recommendations feature which allows users to recommend content similar to the content which was just broadcast. The recommendations feature on the user interface 160 may read something along the lines of, "Users Who Enjoyed This Content May Also Enjoy: _____" where the user then fills in the blank with the recommended content. If enough users recommend the same content, that content may also be added to the content submission queue and/or the content lineup.

The user interface 160 is by way of example only and may vary in further embodiments. Moreover, while the above describes eliciting feedback at the completion of content, it is contemplated that the user may also provide such feedback in the middle of a content piece, or even prior to the showing of the content.

Upon receiving feedback from the user in step 390, the community channel manager 130 may store the feedback in the community channel store in step 392. In step 394, the community channel manager 130 retrieves the user's reputation index, and in step 396, the community channel manager 130 determines whether to remove a given content piece from the channel lineup based on the feedback received from all users in combination with each user's reputation index for that channel. In further embodiments, it is understood that reputation indices may be omitted or not used, and each user's feedback be weighted the same.

In step 396, the community channel manager may determine to remove content from the channel lineup if, for example, some percentage (e.g., 60%) of votes indicated that users did not like the content, or if the aggregate score on a scale from 1 to 10 was lower than some threshold value (e.g., 4). In the event the community channel manager determines that it is the general opinion of the community for that channel that a piece of content is not worth keeping in the lineup, that content is removed from the channel lineup in step 398. On the other hand, if community viewers on the whole do not wish to remove that content from the lineup, step 398 may be skipped and the content maintained in the channel lineup. Although not shown in the flowchart of FIG. 3C, a content piece may also receive a favorable rating to the point where it is either shown more frequently, or moved for example to prime time viewing hours.

Referring now to step 400 and user interface 152 on FIG. 5, the user may also be given the option to exit the community channel platform. If the user chooses to exit, the operations of community channel manager 130 terminate. If the user does not elect to exit community channels, then the flow may return to step 308 (FIG. 3A) to await user input. The user may further be given the option to exit the community channel platform from any of the user interfaces presented to the user while participating in the community channels.

In embodiments of the present system, users may be driven to the community channel platform from outside of the community channel platform. For example, when a user is viewing a directory of content available in the main media content store 132, content which is also included in one of the community channels in community channel store 136 may be flagged with a visual indicator indicating the content's inclusion in one or more of the community channels. This may indicate to the user that if they like this content, they may find other similar content on the indicated community channel.

In further embodiments of the present system, a chat feature may be added allowing users in the channel community to chat and comment on content they are watching on a given channel. In embodiments, the chat would be displayed to all users within the community for that channel. Users may also be given the option to turn off the chat window on their display.

It is a further feature of the present system to allow advertisers to provide targeted advertising to users within a channel community. As one example, where a channel centers around camping and outdoor life, advertisers specializing in outdoor goods and services can provide targeted advertising for their goods and services to users in that group. Moreover, in embodiments, in addition to providing feedback on the content itself, the user interface seeking user feedback may also include questions relating to certain products or services. These products or services may or may not be related to the subject matter of the community channel. In this way, advertisers may mine demographic information from users within a community channel.

In the embodiments described above, all users can join any and all channels. However, in further embodiments, users may need permission to join a channel. Examples would be a premium services channel that has access to newer or exclusive content in the same manner that a cable company charges users extra for premium channels like HBO. Moreover, in further embodiments, the community channel platform may include audience appropriateness ratings and/or parental controls. These features allow blocks to be set on certain content with higher maturity levels.

The above described methods for implementing community channel media distribution may be described in the general context of computer executable instructions, such as program modules, being executed by a computer (which may include on-demand server 104, tuner 112, computer 114, television 116 and/or hand-held device 118). Generally, program modules include routines, programs, objects, components, data structures, etc., that perform particular tasks or implement particular abstract data types. The present system may also be practiced in distributed computing environments where tasks are performed by remote processing devices that are linked through a communication network. In a distributed computing environment, program modules may be located in both local and remote computer storage media including memory storage devices.

Figure 8:
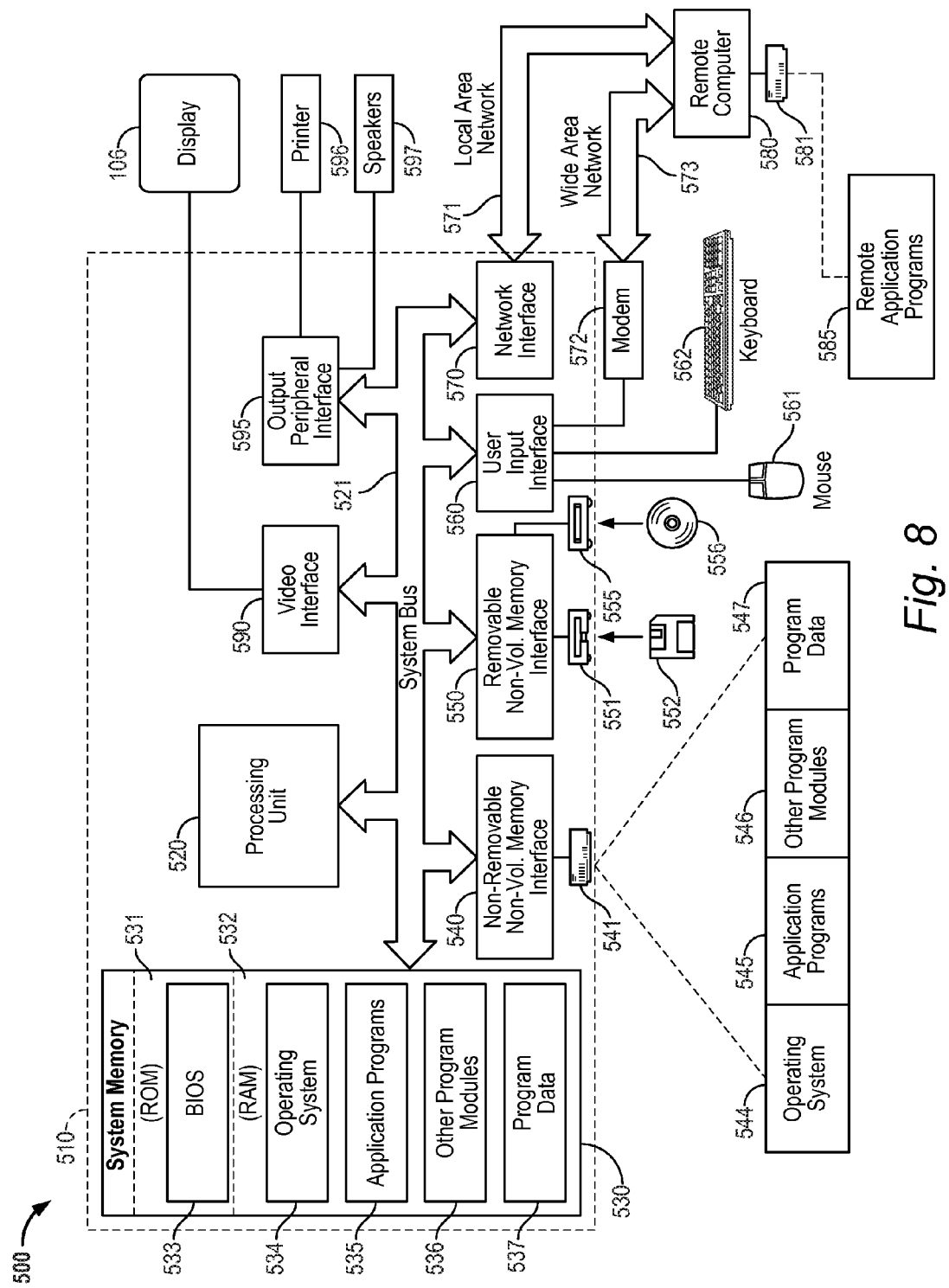
FIG. 8 is a block diagram of a computing environment for implementing a community channel platform according to the present system.

With reference to FIG. 8, a computing environment for implementing the present system includes a general purpose computing device in the form of a computer 510. Components of computer 510 may include, but are not limited to, a processing unit 520 (such as processor 121, FIG. 2), a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVDs) or other optical disk storage, magnetic cassettes, magnetic tapes, magnetic disk storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 530 includes computer storage media in the form of volatile and/or nonvolatile memory such as read only memory (ROM) 531 and random access memory (RAM) 532. A basic input/output system (BIOS) 533, containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 8 illustrates operating system 534 (such as operating system 122), application programs 535 (such as applications 124), other program modules 536, and program data 537.

The computer 510 may also include other removable/non-removable, volatile/nonvolatile computer storage media. By way of example only, FIG. 8 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, DVDs, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 8 provide storage of computer readable instructions, data structures, program modules and other data for the computer 510. In FIG. 8, for example, hard disk drive 541 is illustrated as storing operating system 544, application programs 545, other program modules 546, and program data 547. These components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB). A monitor 120, discussed above, or other type of display device is also connected to the system bus 521 via an interface, such as a video interface 590. In addition to the monitor 120, computer 510 may also include other peripheral output devices such as speakers 597 and printer 595, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 8. The logical connections depicted in FIG. 8 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570 (such as interface 126). When used in a WAN networking environment, the computer 510 typically includes a modem 572 or other means for establishing communication over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 8 illustrates remote application programs 585 as residing on memory device 581. It will be appreciated that the network connections shown are exemplary and other means of establishing a communications link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed is:

1. A computer implemented method of providing a community channel platform within an on-demand content delivery system, the method comprising the steps of:
   (a) defining one or more community channels;
   (b) providing a user interface to a user for the user to select a community channel from the one or more community channels;
   (c) receiving selection from a user of a community channel from the one or more community channels provided in said step (b);
   (d) providing a user interface to the user upon receipt of the selection of the community channel in said step (c), the user interface including the following options from which the user may select:
      (i) watch the community channel,
      (ii) submit content for addition to the community channel,
      (iii) vote whether to accept or deny content submitted by another user to the community channel,
      (iv) suggest the creation of a new community channel, and
      (v) vote on whether to accept or deny a new community channel submitted by another user to the community channel platform;
   (d) providing local playback control by a user of the content delivered locally to the user, advancing by fast forwarding partway to the end, or trailing by rewinding partway to the beginning, of the content delivered locally to the user more than a predetermined amount relative to the content delivered to the entire community of users resulting in the user being presented with an option to exit a community channel and continue to view the content at the user's own pace.

2. The computer implemented method of claim 1, wherein said step (a) of defining one or more community channels comprises setup of the one or more channels by a system administrator based on feedback from users to create the one or more community channels.

3. The computer implemented method of claim 1, further comprising the step of weighting a suggestion from one user to add content to the channel higher than a suggestion from a second user to add content to the channel.

4. The computer implemented method of claim 1, further comprising the step of receiving feedback to terminate a first content piece being pushed to users and terminating the first content piece if the feedback indicates a predetermined portion of the users do not wish to continue receiving the first content piece.

5. The computer implemented method of claim 4, further comprising the step of pushing the next content on the predetermined lineup of content to users upon termination of the first content piece.

6. The computer implemented method of claim 4, further comprising the step of offering users the option to continue to receive the first content piece after the first content piece has been terminated for other users.

7. The computer implemented method of claim 1, wherein said predetermined lineup of content for a channel may initially be selected at least in part at random from a first group of content, and then from any desired content based on user feedback on the desired content.

8. The computer implemented method of claim 1, further comprising the step of pushing content presented on the selected community channel to the user if the user selects the option to watch the community channel.

9. The computer implemented method of claim 8, wherein a vote received on the submitted content from a first user is weighted more than a vote received on the submitted content from a second user, where the first user has had greater history and/or interaction with the channel than the second user.

10. The computer implemented method of claim 1, further comprising the step of adding selected content to a content queue to be voted on by other users if the user selects the option to submit content for addition to the community channel.

11. The computer implemented method of claim 1, further comprising the step of adding a new community channel to a channel queue to be voted on by other users if the user selects the option to submit a new community channel for addition to the community platform.

12. A computer implemented method of providing a community channel platform within an on-demand content delivery system, the method comprising the steps of:
   (a) defining one or more community channels based on feedback from a community of users as to the desirability of the one or more community channels;
   (b) selecting content for a channel in the one or more community channels based on feedback from users who access the channel as to the desirability of receiving the content;
   (c) delivering content selected in said step (b) in a continuous feed to a community of users who access the channel; and
   (d) providing local playback control by a user of the content delivered locally to the user, advancing by fast-forwarding partway to the end, or trailing by rewinding partway to the beginning, of the content delivered locally to the user more than a predetermined amount relative to the content delivered to the entire community of users resulting in the user being presented with an option to exit a community channel and continue to view the content at the user's own pace.

13. The computer implemented method of claim 12, further comprising the step of community playback control by a user of the content delivered to the entire community of users, wherein a single user determines which on-demand content is delivered to the entire community, and whether to fast-forward or rewind through portions of the on-demand content delivered to the entire community.

14. The computer implemented method of claim 13, wherein the user is granted community playback control of the content delivered to the entire community for a fixed period of time.

15. The computer implemented method of claim 14, wherein the period of time is one day.

16. The computer implemented method of claim 12, wherein said step (b) of selecting content based on feedback from users comprises the step of weighting feedback from a first user in the community of users more than feedback from a second user in the community of users, where the first user has a better reputation with respect to the channel than the second user.

17. The computer implemented method of claim 12, wherein said step (b) of selecting content for a channel comprises the steps of receiving a suggestion to add content to the channel, and applying a policy to determine whether to add that suggestion to a queue.

18. The computer implemented method of claim 17, wherein said step (b) of selecting content for a channel further comprises the steps of receiving votes from users in the community whether to add content in the queue to the content automatically streamed in said step (c), and applying a policy based on the received votes and user reputation as to whether to add voted on content to the content automatically streamed in said step (c).

* * * * *